US010885142B2

(12) United States Patent
Lu et al.

(10) Patent No.: US 10,885,142 B2
(45) Date of Patent: Jan. 5, 2021

(54) RECOMMENDED CONTENT PUSHING METHOD, APPARATUS, TERMINAL, SERVER, AND SYSTEM

(71) Applicant: TENCENT TECHNOLOGY (SHENZHEN) COMPANY LIMITED, Shenzhen (CN)

(72) Inventors: Jinggang Lu, Shenzhen (CN); Xiaohai Wei, Shenzhen (CN); Dongsheng Niu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 297 days.

(21) Appl. No.: 15/716,012

(22) Filed: Sep. 26, 2017

(65) Prior Publication Data
US 2018/0025090 A1    Jan. 25, 2018

Related U.S. Application Data

(63) Continuation of application No. PCT/CN2016/086226, filed on Jun. 17, 2016.

(30) Foreign Application Priority Data

Jul. 16, 2015  (CN) .......................... 2015 1 0420704

(51) Int. Cl.
G06F 16/00    (2019.01)
G06F 16/955   (2019.01)
(Continued)

(52) U.S. Cl.
CPC ........ G06F 16/955 (2019.01); G06F 16/9535 (2019.01); G06Q 30/02 (2013.01); G06Q 30/0255 (2013.01); G06Q 30/0269 (2013.01)

(58) Field of Classification Search
CPC ........................... G06F 16/955; G06F 16/9535
(Continued)

(56) References Cited

U.S. PATENT DOCUMENTS

2009/0299860 A1* 12/2009  Yount ................... G06Q 40/02
                                                      705/14.73
2013/0073399 A1   3/2013  Celener Nijamkin et al.
(Continued)

FOREIGN PATENT DOCUMENTS

CN    103177384    6/2013
CN    103200262    7/2013
(Continued)

OTHER PUBLICATIONS

International Preliminary Report on Patentability dated Jan. 16, 2018 in PCT/CN2016/086226 filed Jun. 17, 2016. (with English Translation).

(Continued)

*Primary Examiner* — Chelcie L Daye
(74) *Attorney, Agent, or Firm* — Oblon, McClelland, Maier & Neustadt, L.L.P.

(57) ABSTRACT

According to an aspect of the disclosure, a server device includes interface circuitry and processing circuitry. The interface circuitry is configured to receive a web page request sent from a terminal device, the web page request carrying an identifier of a web page and social application account information of a user. The processing circuitry is configured to obtain the web page requested by the user according to the identifier of the web page, obtain social information of the user according to the social application account information, determine recommended content according to the social information and provide the web page and the recommended content to the interface circuitry to transmit to the terminal device.

15 Claims, 6 Drawing Sheets

(51) Int. Cl.
  *G06Q 30/02* (2012.01)
  *G06F 16/9535* (2019.01)
(58) Field of Classification Search
  USPC .................. 707/758, 751, 728; 709/204
  See application file for complete search history.

(56) References Cited

U.S. PATENT DOCUMENTS

| | | | | |
|---|---|---|---|---|
| 2013/0110827 | A1* | 5/2013 | Nabar | G06F 16/9535 707/728 |
| 2013/0174065 | A1* | 7/2013 | Dayan | G06F 3/048 715/763 |
| 2013/0238697 | A1* | 9/2013 | Mehta | H04L 51/32 709/204 |
| 2014/0164401 | A1* | 6/2014 | Kyaw | G06F 16/9535 707/751 |
| 2014/0372400 | A1* | 12/2014 | Ramachandran | G06F 16/951 707/706 |

FOREIGN PATENT DOCUMENTS

| | | |
|---|---|---|
| CN | 103309990 | 9/2013 |
| CN | 103425670 | 12/2013 |
| CN | 103617230 | 3/2014 |
| CN | 103679513 | 3/2014 |
| CN | 103955842 | 7/2014 |
| CN | 104657428 | 5/2015 |

OTHER PUBLICATIONS

Written Opinion of the International Searching Authority dated Sep. 19, 2016 in PCT/CN2016/086226 filed Jun. 17, 2016. (with English Translation).

Office Action dated Jun. 3, 2019 in Chinese Patent Application No. 201510420704.9 (With Concise English Translation).

International Search Report dated Sep. 19, 2016 in PCT/CN2016/088226 filed Jun. 17, 2016. (with English Translation).

Chinese Office Action dated May 6, 2020 in Chinese Application No. 201510420704.9 (with Concise English Translation).

* cited by examiner

RECOMMENDED CONTENT PUSHING METHOD, APPARATUS, TERMINAL, SERVER, AND SYSTEM

RELATED APPLICATION

This application is as continuation of International Application No. PCT/CN2016/086226, filed on Jun. 17, 2016, which claims priority to Chinese Patent Application 201510420704.9, filed with the Chinese Patent Office an Jul. 16, 2015 and entitled "RECOMMENDED CONTENT PUSHING METHOD, APPARATUS, AND SYSTEM". The entire disclosures of the prior applications are hereby incorporated by reference herein in their entirety.

FIELD OF THE TECHNOLOGY

The present disclosure relates to the field of computer technologies, and specifically, to a recommended content pushing method, apparatus, terminal, server, and system.

BACKGROUND OF THE DISCLOSURE

When browsing a web page, a user often sees some advertisements related or not related to page content. When receiving a page request, a server side pushes some advertisements related or not related to page content to a user equipment. That is why advertisements are presented on the web page.

However, the advertisements are pushed by the server side to the user equipment either randomly or according to page content of the web page. These advertisements may not be advertisements in which the user is interested, causing inaccurate advertisement pushing and unfavorable advertising effects.

SUMMARY

Embodiments of this application provide a recommended content pushing method, apparatus, terminal, server, and system, so as to determine recommended content according to content with which a user is concerned in a social application, and improve recommended content pushing accuracy. The embodiments of this application further provide a corresponding apparatus and system.

Aspects of the disclosure provide a server device for content recommendation. The server device includes interface circuitry and processing circuitry. The interface circuitry is configured to receive a web page request sent from a terminal device, the web page request carrying an identifier of a web page and a social application account of a user. The processing circuitry is configured to obtain the web page requested by the user according to the identifier of the web page, obtain social information of the user according to the social application account, determine recommended content according to the social information and provide the web page and the recommended content to the interface circuitry to transmit to the terminal device.

According to an aspect of the disclosure, the processing circuitry is configured to control the interface circuitry to send a request message to a social application server corresponding to the social application account. The request message carries the social application account, and the social application account is used for determining the social information of the user by the social application server. Further, the processing circuitry is configured to receive, via the interface circuitry, the social information of the user that is sent by the social application server.

In an embodiment, the identifier of the web page comprises at least one of a unique identifier of the web page, a name of the web page, a specific symbol of the web page, and/or an advertising picture of the web page. In an example, the social information of the user comprises a browsing history of the user. In another example, the social information of the user includes a list of topics of interest that are followed by the user.

Aspects of the disclosure provide a server device for a social application. The server device includes interface circuitry and processing circuitry. The interface circuitry is configured to receive a request message from another server device for content recommendation. The request message carries a social application account of a user, and the social application account is provided in a web page request from a terminal device to the other server device. The processing circuitry is configured to determine social information of the user according to the social application account; and provide the social information of the user to the interface circuitry for the interface circuitry to send to the other server device. The social information of the user is used to determine recommended content to be provided to the terminal device.

In an embodiment, the processing circuitry is configured to obtain a browsing history corresponding to the social application account and determine the social information of the user according to the browsing history. In an example, the browsing history is a record stored in the server device. The record includes at least one of a chat record between the user and a friend, a social platform browsing record of the user, and/or an online shopping record of the user.

Aspects of the disclosure provide a terminal device having interface circuitry and processing circuitry. The Processing circuitry is configured to determine a social application account of a user according to an instruction for requesting a web page. The interface circuitry configured to send a web page request to a server device. The web page request carries an identifier of the web page and the social application account. The identifier of the web page is used by the server device to obtain the web page, and the social application account is used for obtaining one or more topics of interest by the user, and determining recommended content according to the one or more topics. Further, the interface circuitry receives, in response to the web page request, the web page and the recommended content that are provided by the server device.

In an embodiment, the processing circuit is configured to select, from a plurality of social application accounts, the social application account that is most frequently used by the user. In an example, the processing circuitry is configured to include the social application account that is most frequently used by the user in the web page request and the interface circuitry is configured to send the web page request to the server device for the server device to obtain the social information of the user and to determine one or more topics of interest by the user according to the social information.

Aspects of the disclosure provide a method for sending recommendation. The method includes receiving, by a server device, a web page request sent from a terminal device. The web page request carries an identifier of a web page and a social application account of a user. Further, the method includes obtaining the web page according to the identifier of the web page, obtaining social information of the user according to the social application account, determining recommended content according to the social information and sending the web page requested by the user and the recommended content to the user terminal.

Aspects of the disclosure provide a method for sending recommendation. The method includes determining, at a terminal device, a social application account of a user according to an instruction input by the user for requesting a web page, and sending a web page request to a server device for content recommendation. The web page request carries an identifier of the web page and the social application account, the identifier of the web page is used for obtaining the web page by the server device, and the social application account is used for obtaining one or more topics of interest by the user, and determining recommended content according to the one or more topics. Further, the method includes receiving the web page requested by the user and the recommended content that are provided by the server device.

BRIEF DESCRIPTION OF THE DRAWINGS

To describe the technical solutions in the embodiments of this application more clearly, the following briefly describes the accompanying drawings required for describing the embodiments. The accompanying drawings in the following description show merely some embodiments of this application, and a person skilled in the art may still derive other drawings from these accompanying drawings.

DESCRIPTION OF EMBODIMENTS

The embodiments of this application provide a recommended content pushing method, so as to determine recommended content according to content with which a user is concerned in a social application, and improve recommended content pushing accuracy. The embodiments of this application further provide a corresponding apparatus and system. The following gives detailed descriptions.

The following clearly and completely describes the technical solutions in the embodiments of this application with reference to the accompanying drawings in the embodiments of this application. The described embodiments are merely some rather than all of the embodiments of this application. All other embodiments obtained by a person skilled in the art based on the embodiments of this application shall fall within the protection scope of this application.

Figure 1:
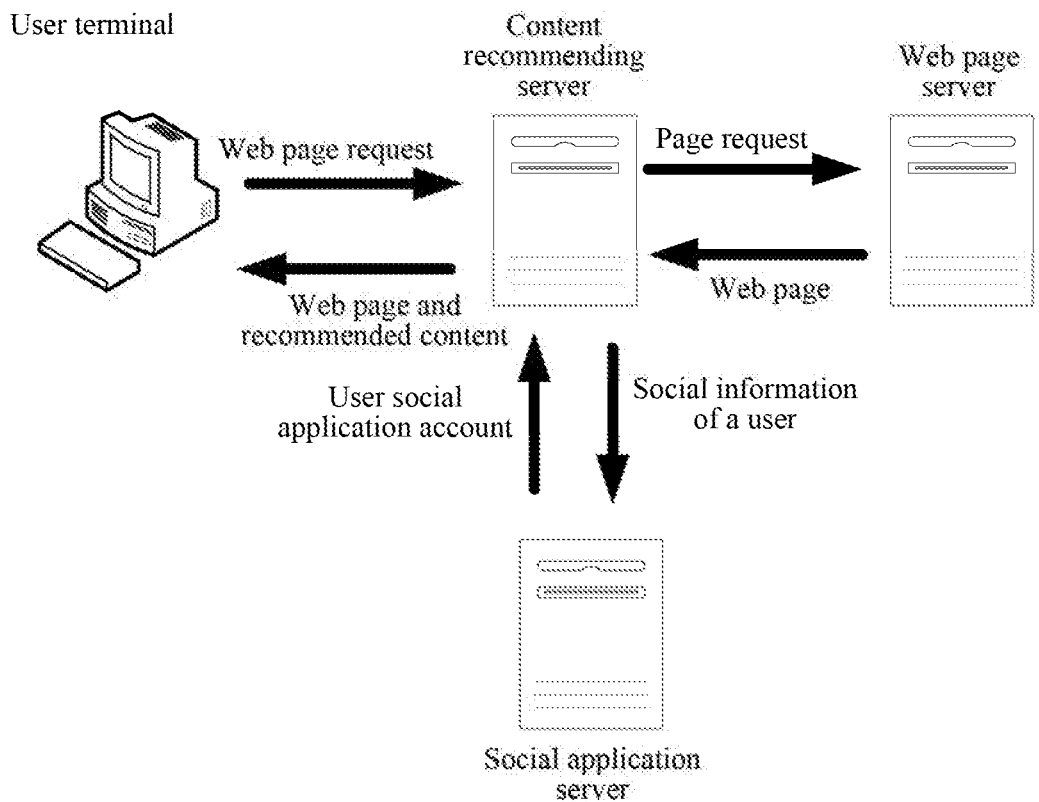
FIG. 1 is a schematic diagram of an embodiment of a recommended content pushing method according to an embodiment of this application.

Referring to FIG. 1, a recommended content pushing method provided by an embodiment of this application includes:

a user terminal, a content recommending server, a web page server, and a social application server, where the user terminal may be a terminal, on which a browser or a social application may be installed, such as a mobile phone, a notebook computer, or a personal computer (PC). The browser in this embodiment of this application may be an X5 webview browser. The social application may be a social application such as WeChat or QQ. The content recommending server may be an advertisement server. The web page server is a server that stores web page content, and one web page address corresponds to one piece of web page content. The social application server may be a WeChat server, a QQ server, or the like.

When browsing a web page by using a browser on a user terminal, a user may click a web page address, and then the browser sends a web page request to a web page server. In this embodiment of this application, after a user clicks a web page address, the user terminal obtains a user social application account such as a WeChat account or a QQ account, and a most frequently used social application account such as a QQ account may be selected. The user terminal sends a web page request to a content recommending server, the web page request carries an identifier of a web page requested by the user and the user social application account. The identifier of the web page requested by the user may be an address of the web page requested by the user.

After receiving the web page request sent by the user terminal, the content recommending server parses out the identifier of the web page requested by the user and the user social application account that are carried in the web page request. The content recommending server sends a page request to the web page server, where the page request carries the identifier of the web page requested by the user.

After receiving the page request, the web page server searches for a corresponding web page according to the identifier of the web page requested by the user, and returns the web page to the content recommending server. The identifier and the web page are stored in correspondence with each other in the web page server. After obtaining the identifier of the web page requested by the user, the web page server can find the corresponding web page.

Meanwhile, the content recommending server sends a social application account to the social application server. The social application server obtains, according to the social application account, a browsing history corresponding to the user social application account, and determines, according to the browsing history, content with which the user is concerned. The browsing history may be a historical chat record between the user and friends, or may be a record of social platforms browsed by the user, a Weibo record, some online shopping records of the user, or the like. Any record can be found, provided that such record is stored in the social application server. However, to improve searching efficiency, a browsing history within a recent period of time may be searched, for example, a browsing history within half a month or a week. Specific duration may be set according to an actual requirement. For example, as shown in FIG. 2, when the web page requested by the user is a piece of news, the social application server determines, according to a social application account, that the user is quite interested in automobiles recently, for example, automobile brands, types, or prices, and then reports such content with which the user is concerned to the content recommending server.

Figure 3:
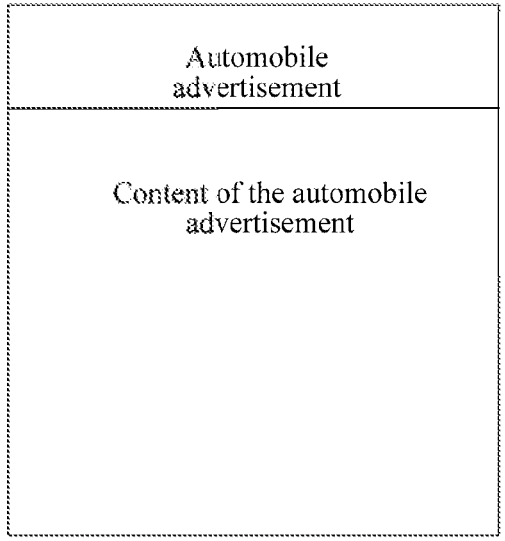
FIG. 3 is another schematic diagram of an instance according to an embodiment of this application.

The content recommending server determines a proper piece of recommended content according to the content with which the user is concerned reported by the social application server, for example, as shown in FIG. 3, determines an automobile advertisement.

Figure 2:
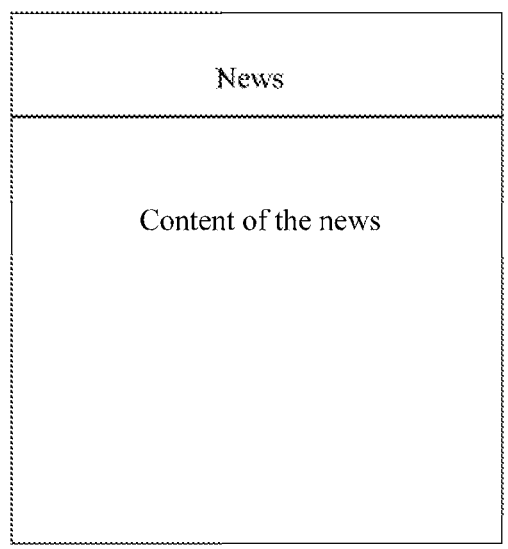
FIG. 2 is a schematic diagram of an instance according to an embodiment of this application.

The content recommending server pushes the news shown in FIG. 2 and the automobile advertisement shown in FIG. 3 to the user terminal, and the user terminal displays the news and the automobile advertisement. A specific display solution may be an overlapping display solution or another display solution.

Compared with advertisements recommended on a web page that are pushed either randomly or according to page content of the web page, in the recommended content pushing method provided by this embodiment of this application, recommended content can be determined according to content with which a user is concerned in a social application, thereby improving recommended content pushing accuracy. In addition, in this embodiment of this application, the content with which the user is concerned is determined based on a social application account, and a social application server stores a browsing history of the user, covering rich and detailed content. Therefore, some browsing information input by the user in a browser does not need to be separately recorded. The recommended content pushing method provided by this embodiment of this application further improves recommended content targeting efficiency while improving targeting accuracy.

Figure 4:
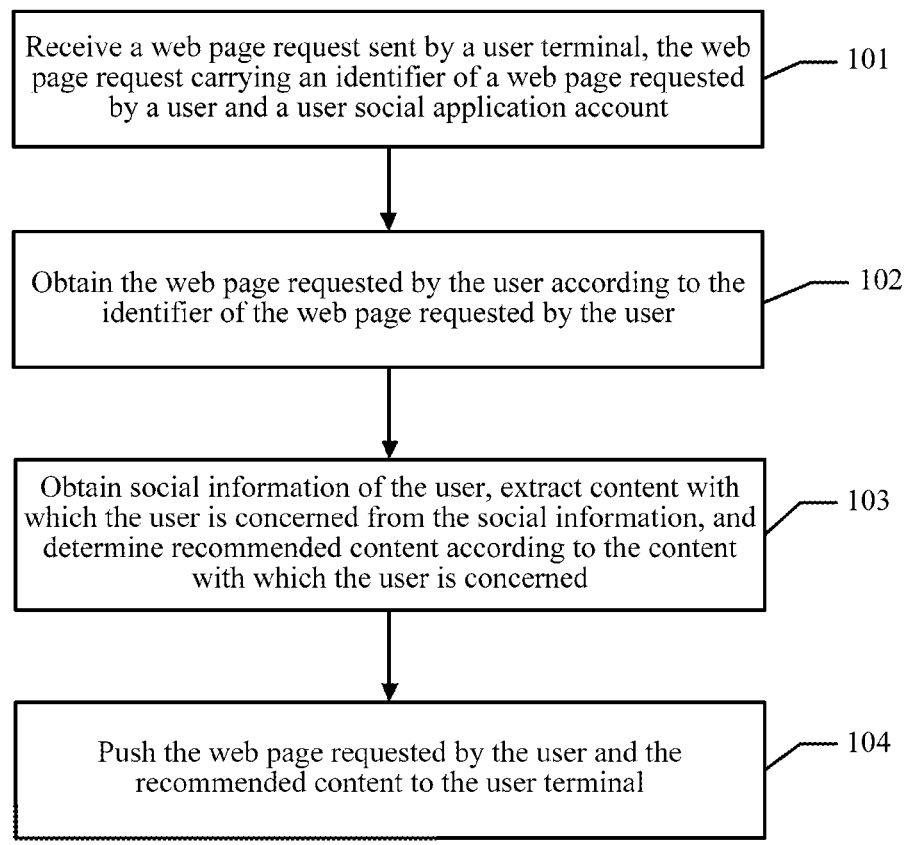
FIG. 4 is a schematic diagram of a recommended content pushing method according to an embodiment of this application.

Referring to FIG. 4, an embodiment of a recommended content pushing method provided by an embodiment of this application includes steps 101 to 104.

Step 101. Receive a web page request sent by a user terminal, the web page request carrying an identifier of a web page requested by a user and a user social application account.

The identifier of the web page requested by the user may be an address of the web page requested by the user, or may be a unique identifier of the web page, a name of the web page, a specific symbol of the web page, and/or an advertising picture of the web page. The user social application account may be an instant messaging account such as a WeChat account or a QQ account.

Step 102. Obtain the web page requested by the user according to the identifier of the web page requested by the user.

Step 103. Obtain social information of the user, extract content with which the user is concerned from the social information, and determine recommended content according to the content with which the user is concerned.

Step 104. Push the web page requested by the user and the recommended content to the user terminal.

According to this embodiment of this application, a web page request sent by a user terminal is received, the web page request carrying an identifier of a web page requested by a user and a user social application account (e.g., account information, such as account number, account identification, and the like); the web page requested by the user is obtained according to the identifier of the web page requested by the user; social information of the user is obtained, content with which the user is concerned is extracted from the social information, and recommended content is determined according to the content with which the user is concerned; and the web page requested by the user and the recommended content are pushed to the user terminal. Compared with advertisements recommended on a web page that are pushed either randomly or according to page content of the web page, in the recommended content pushing method provided by this embodiment of this application, recommended content can be determined according to content with which a user is concerned in a social application, thereby improving recommended content pushing accuracy.

Optionally, based on the foregoing embodiment corresponding to FIG. 4, in another embodiment of the recommended content pushing method provided by this application, the obtaining social information of the user according to the user social application account may include:

sending a request message to a social application server corresponding to the user social application account, the request message carrying the user social application account, and the user social application account being used for determining the social information of the user by the social application server; and receiving the social information of the user sent by the social application server.

In this embodiment of this application, the social information of the user may be a browsing history of the user, and specifically, a user browsing history within a recent period of time of the user.

The recommended content pushing method provided by this embodiment of this application may be understood by using the descriptions of the content recommending server in FIG. 1 to FIG. 3.

Figure 5:
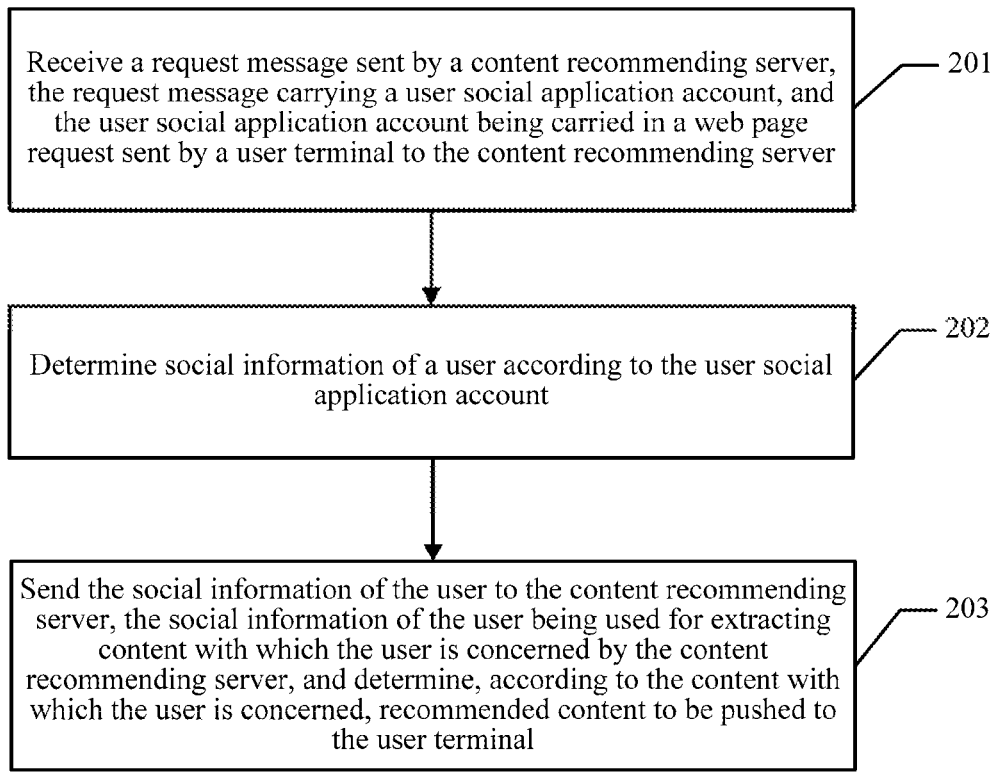
FIG. 5 is a schematic diagram of a recommended content pushing method according to an embodiment of this application.

Referring to FIG. 5, another embodiment of a recommended content pushing method provided by an embodiment of this application includes steps 201 to 203.

Step 201. Receive a request message sent by a content recommending server, the request message carrying a user social application account, and the user social application account being carried in a web page request sent by a user terminal to the content recommending server.

Step 202. Determine social information of a user according to the user social application account.

Step 203. Send the social information of the user to the content recommending server, the social information of the user being used for extracting content with which the user is concerned by the content recommending server, and determine, according to the content with which the user is concerned, recommended content to be pushed to the user terminal.

In this embodiment of this application, a request message sent by a content recommending server is received, the request message carrying a user social application account, and the user social application account being carried in a web page request sent by a user terminal to the content recommending server; social information of the user is determined according to the user social application account; and the social information of the user is sent to the content recommending server, the social information of the user being used for extracting content with which the user is concerned by the content recommending server, and recommended content to be pushed to the user terminal is determined according to the content with which the user is concerned. Compared with advertisements recommended on a web page that are pushed either randomly or according to page content of the web page, in the recommended content pushing method provided by this embodiment of this application, recommended content can be determined according to content with which a user is concerned in a social application, thereby improving recommended content pushing accuracy.

Optionally, based on the foregoing embodiment corresponding to FIG. 5, in another embodiment of the recommended content pushing method provided by this application, the determining social information of a user according to the user social application account may include:

obtaining a browsing history corresponding to the user social application account; and determining the social information of the user according to the browsing history.

In this embodiment of this application, the browsing history may be a historical chat record between the user and friends, or may be a record of social platforms (such as QQ zone and Weibo) browsed by the user, some online shopping records of the user, or the like. Any record can be found, provided that such record is stored in the social application server. However, to improve searching efficiency, a browsing history within a recent period of time may be searched, for example, a browsing history within half a month or a week. Specific duration may be set according to an actual requirement.

The recommended content pushing method provided by this embodiment of this application may be understood by using the descriptions of the social application server in FIG. 1 to FIG. 3.

Figure 6:
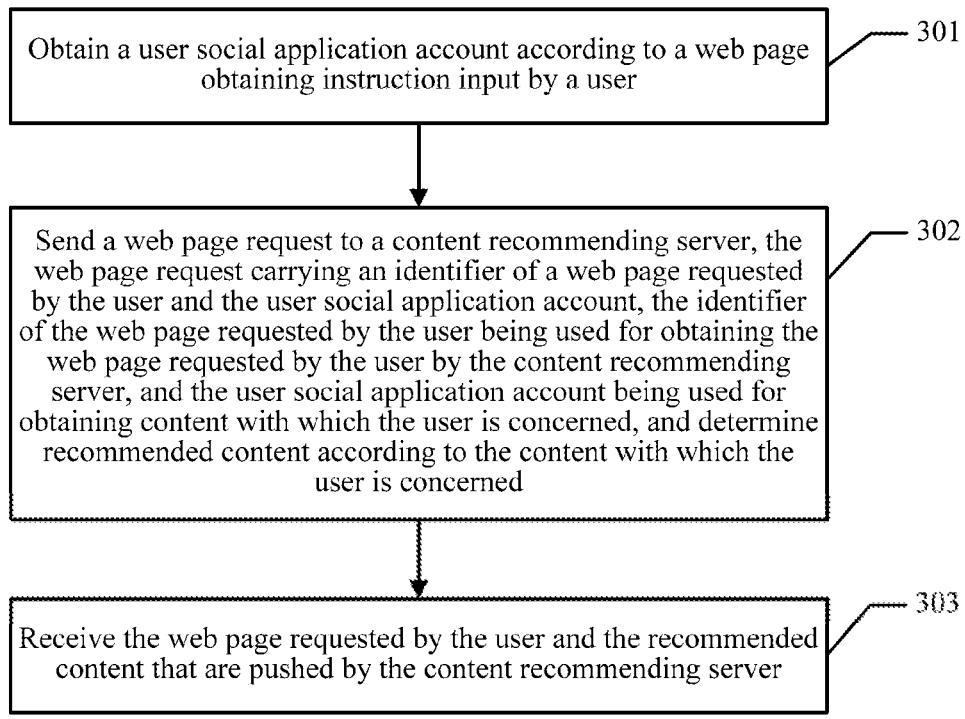
FIG. 6 is a schematic diagram of a recommended content pushing method according to an embodiment of this application.

Referring to FIG. 6, a recommended content pushing method provided by an embodiment of this application includes steps 301 to 303.

Step 301. Obtain a user social application account according to a web page obtaining instruction input by a user.

Step 302. Send a web page request to a content recommending server, the web page request carrying an identifier of a web page requested by the user and the user social application account, the identifier of the web page requested by the user being used for obtaining the web page requested by the user by the content recommending server, and the user social application account being used for obtaining content with which the user is concerned, and determine recommended content according to the content with which the user is concerned.

Step 303. Receive the web page requested by the user and the recommended content that are pushed by the content recommending server.

In this embodiment of this application, a user social application account is obtained according to a web page obtaining instruction input by a user; a web page request is sent to a content recommending server, the web page request carrying an identifier of a web page requested by the user and the user social application account, the identifier of the web page requested by the user being used for obtaining the web page requested by the user by the content recommending server, and the user social application account being used for obtaining content with which the user is concerned, and recommended content is determined according to the content with which the user is concerned; and the web page requested by the user and the recommended content that are pushed by the content recommending server are received. Compared with advertisements recommended on a web page that are pushed either randomly or according to page content of the web page, in the recommended content pushing method provided by this embodiment of this application, a user social application account is added to a web page request when the web page request is sent, so that a content recommending server can determine recommended content according to content with which a user is concerned in a social application, thereby improving recommended content pushing accuracy.

Based on the foregoing embodiment corresponding to FIG. 6, in another embodiment of the recommended content pushing method provided by this application, the obtaining a user social application account may include: obtaining a social application account most frequently used by the user; and the sending a web page request to a content recommending server, the web page request carrying an identifier of a web page requested by the user and the user social application account may include: sending the web page request to the content recommending server, the web page request carrying the identifier of the web page requested by the user and the social application account most frequently used by the user, and the social application account most frequently used by the user being used for obtaining the content with which the user is concerned.

In this embodiment of this application, a social application account most frequently used by the user is obtained, so that accuracy of determining content with which the user is concerned can be improved, thereby further improving accuracy of recommended content.

The recommended content pushing method provided by this embodiment of this application may be understood by using the descriptions of the user terminal in FIG. 1 to FIG. 3.

Figure 7:
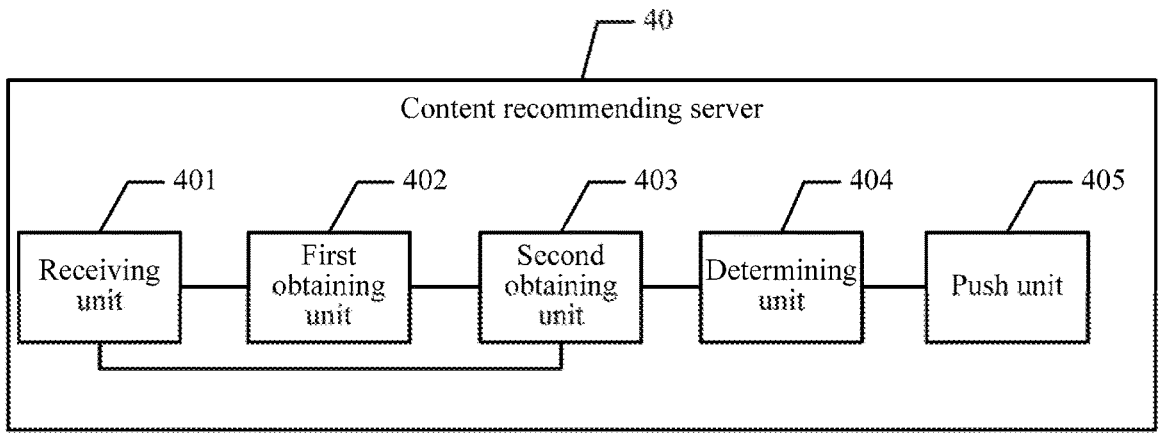
FIG. 7 is a schematic diagram of a content recommending server according to an embodiment of this application.

Referring to FIG. 7, a content recommending server 40 provided by an embodiment of this application includes: a receiving unit 401, a first obtaining unit 402, a second obtaining unit 403, a determining unit 404, and a push unit 405.

The receiving unit 401 is configured to receive a web page request sent by a user terminal, the web page request carrying an identifier of a web page requested by a user and a user social application account.

The first obtaining unit 402 is configured to obtain the web page requested by the user according to the identifier of the web page requested by the user received by the receiving unit 401.

The second obtaining unit 403 is configured to obtain social information of the user according to the user social application account received by the receiving unit 401.

The determining unit 404 is configured to: extract, according to the social information obtained by the second obtaining unit 403, content with which the user is concerned, and determine recommended content according to the content with which the user is concerned.

The push unit 405 is configured to push, to the user terminal, the web page requested by the user obtained by the first obtaining unit and the recommended content determined by the determining unit 402.

In this embodiment of this application, the receiving unit 401 receives a web page request sent by a user terminal, the web page request carrying an identifier of a web page requested by a user and a user social application account; the first obtaining unit 402 obtains the web page requested by the user according to the identifier of the web page requested by the user received by the receiving unit 401; the second obtaining unit 403 obtains social information of the user according to the user social application account received by the receiving unit 401; the determining unit 404 extracts, according to the social information obtained by the second obtaining unit 403, content with which the user is concerned, and determines recommended content according to the content with Which the user is concerned; and the push unit 405 pushes, to the user terminal, the web page requested by the user obtained by the first obtaining unit 402 and the recommended content determined by the determining unit. Compared with advertisements recommended on a web page that are pushed either randomly or according to page content of the web page, the content recommending server provided by this embodiment of this application can determine recommended content according to content with which a user is concerned in a social application, thereby improving recommended content pushing accuracy.

Figure 8:
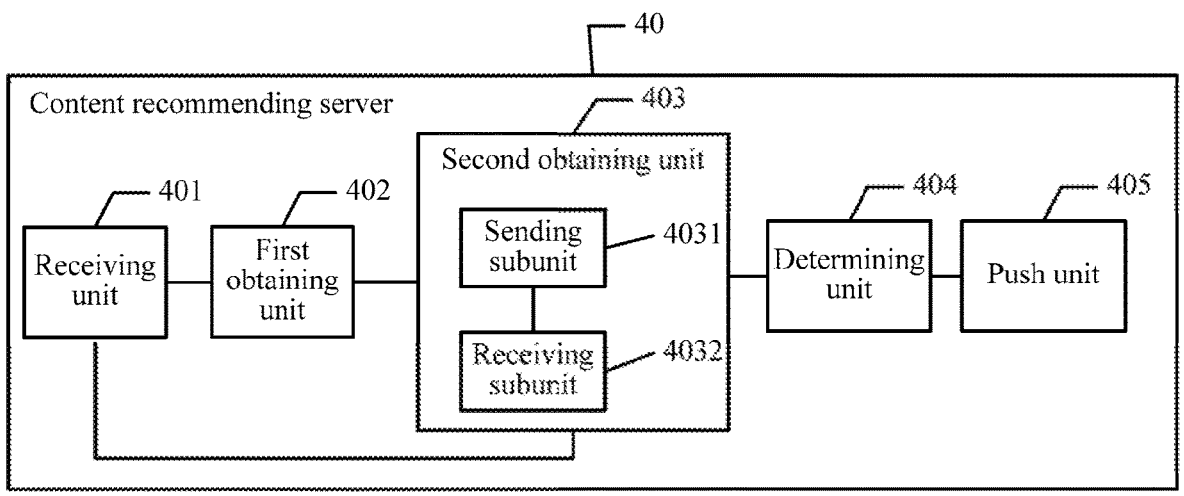
FIG. 8 is a schematic diagram of a content recommending server according to an embodiment of this application.

Optionally, based on the foregoing embodiment corresponding to FIG. 7, referring to FIG. 8, in another embodiment of the content recommending server 40 provided by this application, the second obtaining unit 403 includes a sending subunit 4031 and a receiving subunit 4032.

The sending subunit 4031 is configured to send a request message to a social application server corresponding to the user social application account, the request message carrying the user social application account, and the user social application account being used for determining the social information of the user by the social application server.

The receiving subunit 4032 is configured to receive the social information of the user sent by the social application server.

The content recommending server provided by this embodiment of this application may be understood by using the descriptions of the content recommending server in FIG. 1 to FIG. 4.

Figure 9:
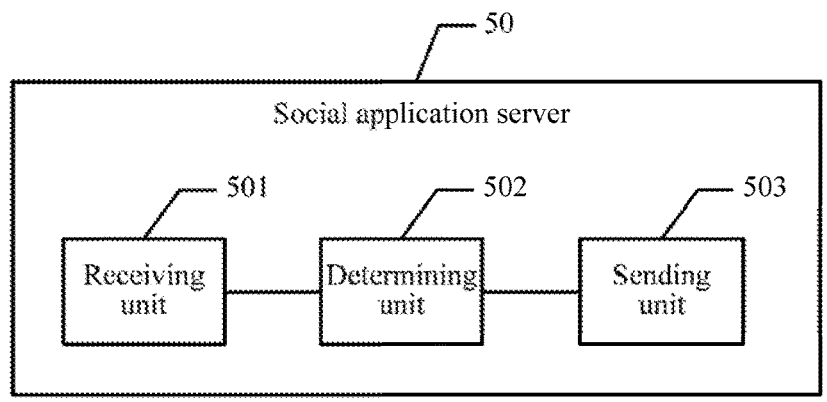
FIG. 9 is a schematic diagram of a social application server according to an embodiment of this application.

Referring to FIG. 9, an embodiment of a social application server 50 provided by an embodiment of this application includes a receiving unit 501, a determining unit 502, and a sending unit 503.

The receiving unit 501 is configured to receive a request message sent by a content recommending server, the request message carrying a user social application account, and the user social application account being carried in a web page request sent by a user terminal to the content recommending server.

The determining unit 502 is configured to determine social information of a user according to the user social application account received by the receiving unit 501.

The sending unit 503 is configured to: send the social information of the user determined by the determining unit 502 to the content recommending server, the social information of the user being used for extracting content with which the user is concerned by the content recommending server, and determine, according to the content with which the user is concerned, recommended content to be pushed to the user terminal.

In this embodiment of this application, the receiving unit 501 receive a request message sent by a content recommending server, the request message carrying a user social application account, and the user social application account being carried in a web page request sent by a user terminal to the content recommending server; the determining unit 502 determines social information of a user according to the user social application account received by the receiving unit 501; and the sending unit 503 sends the social information of the user determined by the determining unit 502 to the content recommending server, the social information of the user being used for extracting content with which the user is concerned by the content recommending server, and determines, according to the content with which the user is concerned, recommended content to be pushed to the user terminal. Compared with the advertisements recommended on a web page that are pushed either randomly or according to page content of the web page, the social application server provided by this embodiment of this application can determine recommended content according to content with which a user is concerned in a social application, thereby improving recommended content pushing accuracy.

Optionally, based on the embodiment corresponding to FIG. 9, in another embodiment of the social application server 50 provided by this application, the determining unit 502 is configured to: obtain a browsing history corresponding to the user social application account; and determine the social information of the user according to the browsing history.

The content recommending server provided by this embodiment of this application may be understood by using the descriptions of the content recommending server in FIG. 1 to FIG. 3 and FIG. 5.

Figure 10:
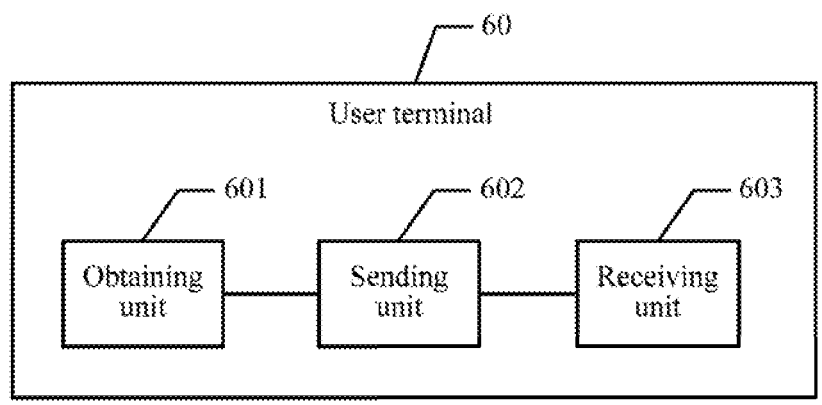
FIG. 10 is a schematic diagram of a user terminal according to an embodiment of this application.

Referring to FIG. 10, a user terminal 60 provided by an embodiment of this application includes an obtaining unit 601, a sending unit 602, and a receiving unit 603.

The obtaining unit 601 is configured to obtain a user social application account according to a web page obtaining instruction input by a user.

The sending unit 602 is configured to: send a web page request to a content recommending server, the web page request carrying an identifier of a web page requested by the user and the user social application account that is obtained by the obtaining unit 601, the identifier of the web page requested by the user being used for obtaining the web page requested by the user by the content recommending server, and the user social application account being used for obtaining content with which the user is concerned, and determine recommended content according to the content with which the user is concerned.

The receiving unit 603 is configured to: after the sending unit 602 sends the web page request, receive the web page requested by the user and the recommended content that are pushed by the content recommending server.

In this embodiment of this application, the obtaining unit 601 obtains a user social application account according to a web page obtaining instruction input by a user; the sending unit 602 sends a web page request to a content recommending server, the web page request carrying an identifier of a web page requested by the user and the user social application account that is obtained by the obtaining unit 601, the identifier of the web page requested by the user being used for obtaining the web page requested by the user by the content recommending server, and the user social application account being used for obtaining content with which the user is concerned, and determines recommended content according to the content with which the user is concerned; and after the sending unit 602 sends the web page request, the receiving unit 603 receives the web page requested by the user and the recommended content that are pushed by the content recommending server. Compared with advertisements recommended on a web page that are pushed either randomly or according to page content of the web page, the user terminal provided by this embodiment of this application adds a user social application account to a web page request when sending the web page request, so that a content recommending server can determine recommended content according to content with which a user is concerned in a social application, thereby improving recommended content pushing accuracy.

Optionally, based on the embodiment corresponding to FIG. 10, in another embodiment of the user terminal 60 provided by this application, the obtaining unit 601 is configured to obtain a social application account most frequently used by the user; and the sending unit 602 is configured to send the web page request to the content recommending server, the web page request carrying the identifier of the web page requested by the user and the social application account most frequently used by the user, and the social application account most frequently used by the user being used for obtaining the content with which the user is concerned.

The content recommending server provided by this embodiment of this application may be understood by using the descriptions of the content recommending server in FIG. 1 to FIG. 3 and FIG. 6.

Figure 11:
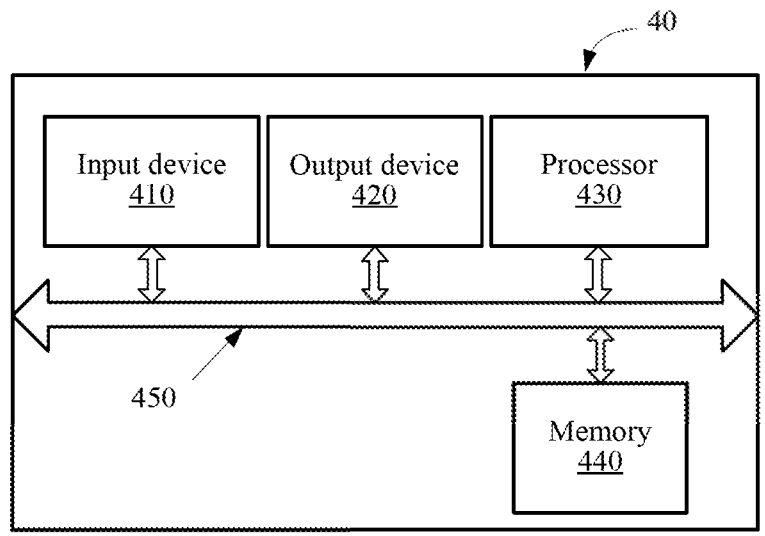
FIG. 11 is a schematic diagram of a content recommending server according to an embodiment of this application.

FIG. 11 is a schematic structural diagram of a content recommending server 40 in an embodiment of this application. The content recommending server 40 may include an input device 410, an output device 420, a processor 430, and a memory 440.

The memory 440 may include a read-only memory (ROM) and a random access memory (RAM), and provides an instruction and data for the processor 430. A part of the memory 440 may further include a non-volatile RAM (NVRAM).

The memory 440 stores the following elements, executable modules or data structures, or a subset thereof, or an extended set thereof:

operation instructions: including various operation instructions, used for implementing various operations; and an operating system: including various system programs, used for implementing various fundamental services and processing hardware-based tasks.

In this embodiment of this application, the processor 430 invokes the operation instructions (where the operation instructions may be stored in the operating system) stored in the memory 440 to perform the following operations:

receiving, by using the input device 410, a web page request sent by a user terminal, the web page request carrying an identifier of a web page requested by a user and a user social application account;

obtaining the web page requested by the user according to the identifier of the web page requested by the user;

obtaining social information of the user according to the user social application account, extracting content with which the user is concerned from the social information, and determining recommended content according to the content with which the user is concerned; and pushing, by using the output device 420, the web page requested by the user and the recommended content to the user terminal.

Compared with advertisements recommended on a web page that are pushed either randomly or according to page content of the web page, in the recommended content pushing method provided by this embodiment of this application, recommended content can be determined according to content with which a user is concerned in a social application, thereby improving recommended content pushing accuracy.

The processor 430 controls operations of the content recommending server 40, and the processor 430 may also be referred to as a central processing unit (CPU). The memory 440 may include a ROM and a RAM, and provides an instruction and data for the processor 430. A part of the memory 440 may further include an NVRAM. In specific application, components of the content recommending server 40 are coupled together by using a bus system 450, where in addition to a data bus, the bus system 450 may further include a power bus, a control bus, a status signal bus, and the like. However, for clear description, various buses are all labeled as the bus system 450 in the figure.

The method disclosed in this embodiment of this application may be applied to the processor 430, or implemented by the processor 430. The processor 430 may be an integrated circuit chip and has a signal processing capability. In an implementation process, each step of the method may be completed by using an integrated logic circuit of hardware in the processor 430 or an instruction in a form of software. The foregoing processor 430 may be a general purpose processor, a digital signal processor (DSP), ads application-specific integrated circuit (ASIC), a field programmable gate array (FPGA), or another programmable logical device, discrete gate or transistor logical device, or discrete hardware component. The processor 430 may implement or perform methods, steps and logical block diagrams disclosed in this embodiment of this application. The general purpose processor may be a microprocessor or the processor may be any conventional processor or the like. The steps of the method disclosed with reference to this embodiment of this application may be directly performed and completed by a hardware decoding processor, or may be performed and completed by using a combination of hardware and software modules in the decoding processor. The software module may be located in a mature storage medium in the art, such as a RAM, a flash memory, a ROM, a programmable ROM, an electrically-erasable programmable memory, or a register. The storage medium is located in the memory 440, and the processor 430 reads information in the memory 440, and completes the steps of the method in combination with hardware thereof.

Optionally, the output device 420 is configured to send a request message to a social application server corresponding to the user social application account, the request message carrying the user social application account, and the user social application account being used for determining the social information of the user by the social application server; and the input device 410 is configured to receive the social information of the user sent by the social application server.

Figure 12:
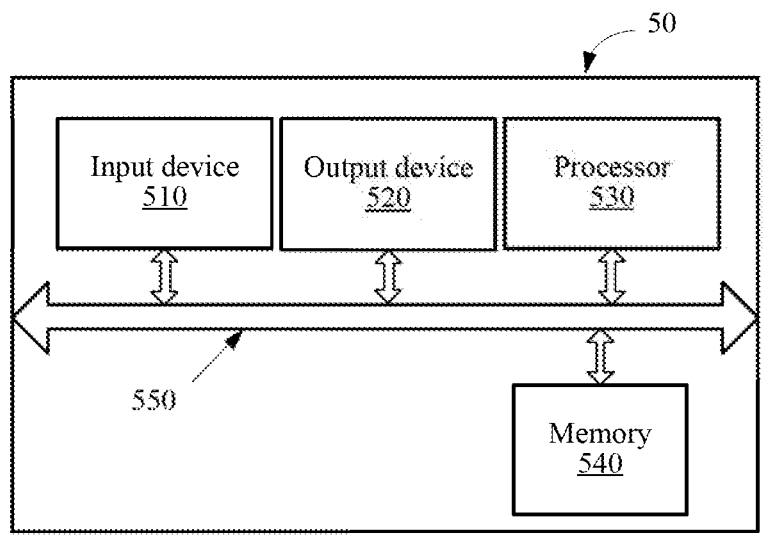
FIG. 12 is a schematic diagram of a social application server according to an embodiment of this application.

FIG. 12 is a schematic structural diagram of a social application server 50 in an embodiment of this application. The social application server 50 may include an input device 510, an output device 520, a processor 530, and a memory 540.

The memory 540 may include a ROM and a RAM, and provides an instruction and data for the processor 530. A part of the memory 540 may further include an NVRAM.

The memory 540 stores the following elements, executable modules or data structures, or a subset thereof, or an extended set thereof:

operation instructions: including various operation instructions, used for implementing various operations; and an operating system: including various system programs, used for implementing various fundamental services and processing hardware-based tasks.

In this embodiment of this application, the processor 530 invokes the operation instructions (where the operation instructions may be stored in the operating system) stored in the memory 540 to perform the following operations:

receiving, by using the input device 510, a request message sent by a content recommending server, the request message carrying a user social application account, and the user social application account being carried in a web page request sent by a user terminal to the content recommending server;

determining social information of a user according to the user social application account; and sending, by using the output device 520, the social information of the user to the content recommending server, the social information of the user being used for extracting content with which the user is concerned by the content recommending server, and determining, according to the content with which the user is concerned, recommended content to be pushed to the user terminal.

Compared with advertisements recommended on a web page that are pushed either randomly or according to page content of the web page, in the recommended content pushing method provided by this embodiment of this application, recommended content can be determined according to content with which a user is concerned in a social application, thereby improving recommended content pushing accuracy.

The processor 530 controls operations of the social application server 50, and the processor 530 may also be referred to as a CPU. The memory 540 may include a ROM and a RAM, and provides an instruction and data for the processor 530. A part of the memory 540 may further include an NVRAM. In specific application, components of the social application server 50 are coupled together by using a bus system 550, where in addition to a data bus, the bus system 550 may further include a power bus, a control bus, a status signal bus, and the like. However, for clear description, various buses are all labeled as the bus system 550 in the figure.

The method disclosed in this embodiment of this application may be applied to the processor 530, or implemented by the processor 530. The processor 530 may be an integrated circuit chip and has a signal processing capability. In an implementation process, each step of the method may be completed by using an integrated logic circuit of hardware in the processor 530 or an instruction in a form of software. The foregoing processor 530 may be a general purpose processor, a DSP, an ASIC, an FPGA, or another programmable logical device, discrete gate or transistor logical device, or discrete hardware component. The processor 530 may implement or perform methods, steps and logical block diagrams disclosed in this embodiment of this application. The general purpose processor may be a microprocessor or the processor may be any conventional processor or the like. The steps of the method disclosed with reference to this embodiment of this application may be directly performed and completed by a hardware decoding processor, or may be performed and completed by using a combination of hardware and software modules in the decoding processor. The software module may be located in a mature storage medium in the art, such as a RAM, a flash memory, a ROM, a programmable ROM, an electrically-erasable programmable memory, or a register. The storage medium is located in the memory 540, and the processor 530 reads information in the memory 540, and completes the steps of the method in combination with hardware thereof.

Optionally, the processor 530 is configured to: obtain a browsing history corresponding to the user social application account; and determine the social information of the user according to the browsing history.

Figure 13:
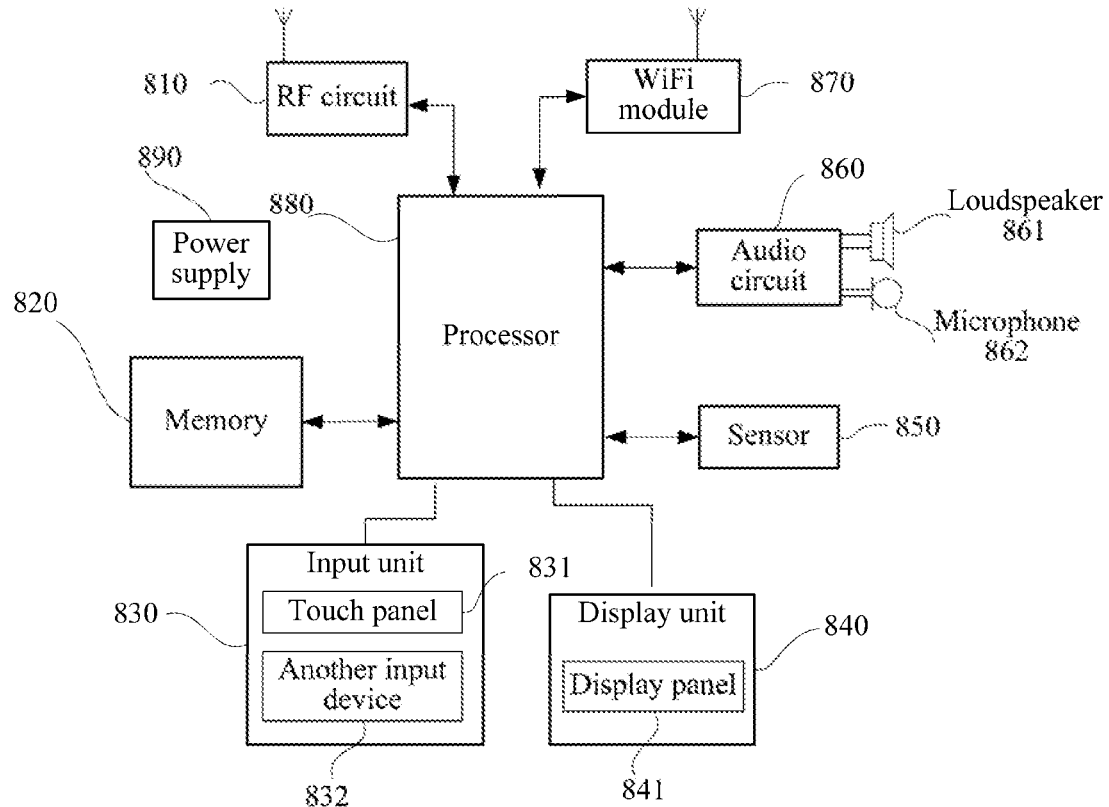
FIG. 13 is a schematic diagram of a user terminal according to an embodiment of this application.

FIG. 13 is a block diagram of a partial structure of a mobile phone related to a user terminal according to an embodiment of this application. Referring to FIG. 13, the mobile phone includes components such as a radio frequency (RF) circuit 810, a memory 820, an input unit 830, a display unit 840, a sensor 850, an audio circuit 860, WiFi module 870, a processor 880, and a power supply 890. A person skilled in the art may understand that the structure of the mobile phone shown in FIG. 13 does not constitute a limitation to the mobile phone, and the mobile phone may include more or fewer components than those shown in the figure, or some components may be combined, or a different component deployment may be used.

The following specifically describes the components of the mobile phone with reference to FIG. 13.

The RF circuit 810 may be configured to receive and send signals during an information receiving and sending process or a call process. Particularly, the RF circuit 810 receives downlink information from a base station, then delivers the downlink information to the processor 880 for processing, and sends related uplink data to the base station. Generally, the RF circuit includes, but is not limited to, an antenna, at least one amplifier, a transceiver, a coupler, a low noise amplifier (LNA), and a duplexer. In addition, the RF circuit 810 may also communicate with a network and another device by means of wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), email, Short Messaging Service (SMS), and the like.

The memory 820 may be configured to store a software program and module. The processor 880 runs the software program and module stored in the memory 820, to perform various functional applications and data processing of the mobile phone. The memory 820 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 820 may include a high speed RAM, and may also include a non-volatile memory such as at least one magnetic disk storage device, a flash memory, or another volatile solid-state storage device.

The input unit 830 may be configured to receive input digit or character information, and generate a keyboard signal input related to the user setting and function control of the mobile phone 800. Specifically, the input unit 830 may include a touch panel 831 and another input device 832. The touch panel 831, which may also be referred to as a touch screen, may collect a touch operation of a user on or near the touch panel (such as an operation of a user on or near the touch panel 831 by using any suitable object or accessory such as a finger or a stylus), and drive a corresponding connection apparatus according to a preset program. Optionally, the touch panel 831 may include two parts: a touch detection apparatus and a touch controller. The touch detection apparatus detects a touch position of the user, detects a signal generated by the touch operation, and transfers the signal to the touch controller. The touch controller receives the touch information (e.g., touch signal) front the touch detection apparatus, converts the touch information into touch point coordinates, and sends the touch point coordinates to the processor 880. In addition, the touch panel 831 may be a resistive, capacitive, infrared, or surface sound wave type touch panel. In addition to the touch panel 831, the input unit 830 may further include the another input device 832. Specifically, the another input device 832 may include, but is not limited to, one or more of a physical keyboard, a functional key (such as a volume control key or a switch key), a track ball, a mouse, and a joystick.

The display unit 840 may be configured to display information input by the user or information provided for the user, and various menus of the mobile phone. The display unit 840 may include a display panel 841. Optionally, the display panel 841 may be configured by using a liquid crystal display (LCD), an organic light-emitting diode (OLED), or the like. Further, the touch panel 831 may cover the display panel 841. After detecting a touch operation on or near the touch panel 831, the touch panel 731 transfers the touch operation to the processor 880, so as to determine the type of the touch event. Then, the processor 880 provides a corresponding visual output on the display panel 841 according to the type of the touch event. Although in FIG. 13, the touch panel 831 and the display panel 841 are used as two separate parts to implement input and output functions of the mobile phone, in some embodiments, the touch panel 831 and the display panel 841 may be integrated to implement the input and output functions of the mobile phone.

The mobile phone 800 may further include at least one sensor 850, such as an optical sensor, a motion sensor, and other sensors. Specifically, the optical sensor may include an ambient light sensor and a proximity sensor. The ambient light sensor may adjust luminance of the display panel 841 according to brightness of the ambient light. The proximity sensor may switch off the display panel 841 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 860, a loudspeaker 861, and a microphone 862 may provide audio interfaces between the user and the mobile phone. The audio circuit 860 may convert received audio data into an electric signal and transmit the electric signal to the loudspeaker 861. The loudspeaker 861 converts the electric signal into a sound signal for output. On the other hand, the microphone 862 converts a collected sound signal into an electric signal. The audio circuit 860 receives the electric signal and converts the electric signal into audio data, and outputs the audio data to the processor 880 for processing. Then, the processor 880 sends the audio data to, for example, another mobile phone by using the RF circuit 810, or outputs the audio data to the memory 820 for further processing.

WiFi belongs to a short-range wireless transmission technology. The mobile phone may help, by using the WiFi module 870, the user to receive and send e-mails, browse a web page, access streaming media, and so on, which provides wireless broadband Internet access for the user. Although FIG. 13 shows the WiFi module 870, it may be understood that the WiFi module 870 is not a necessary component of the mobile phone 800, and when required, the WiFi module 870 may be omitted as long as the scope of the essence of the present disclosure is not changed.

The processor 880 is the control center of the mobile phone, and is connected to various parts of the mobile phone by using various interfaces and lines. By running or executing the software program and/or module stored in the memory 820, and invoking data stored in the memory 820, the processor 880 performs various functions and data processing of the mobile phone, thereby performing overall monitoring on the mobile phone. Optionally, the processor 880 may include one or more processing units. Preferably, the processor 880 may integrate an application processor and a modem. The application processor mainly processes an operating system, a user interface, an application program, and the like. The modem mainly processes wireless communication. It may be understood that, the foregoing modem may also not be integrated into the processor 880.

The mobile phone 800 further includes the power supply 890 (such as a batter) supplying power to the components. Preferably, the power supply may be logically connected to the processor 880 by using a power management system, thereby implementing functions such as charging, discharging, and power consumption management by using the power management system.

Although not shown in the figure, the mobile phone 800 may further include a camera, a Bluetooth module, and the like, which are not further described herein.

In this embodiment of this application, the processor 880 included in the terminal further has the following functions:

obtaining a user social application account according to a web page obtaining instruction input by a user;

sending a web page request to a content recommending server, the web page request carrying an identifier of a web page requested by the user and the user social application account, the identifier of the web page requested by the user being used for obtaining the web page requested by the user by the content recommending server, and the user social application account being used for obtaining content with which the user is concerned, and determining recommended content according to the content with which the user is concerned; and receiving the web page requested by the user and the recommended content that are pushed by the content recommending server.

Compared with advertisements recommended on a web page that are pushed either randomly or according to page content of the web page, the user terminal provided by this embodiment of this application adds a user social application account to a web page request when sending the web page request, so that a content recommending server can determine recommended content according to content with which a user is concerned in a social application, thereby improving recommended content pushing accuracy.

Optionally, the obtaining a user social application account may include:

obtain a social application account most frequently used by the user; and the sending a web page request to a content recommending server, the web page request carrying an identifier of a web page requested by the user and the user social application account may include:

sending the web page request to the content recommending server, the web page request carrying the identifier of the web page requested by the user and the social application account most frequently used by the user, and the social application account most frequently used by the user being used for obtaining the content with which the user is concerned.

Figure 14:
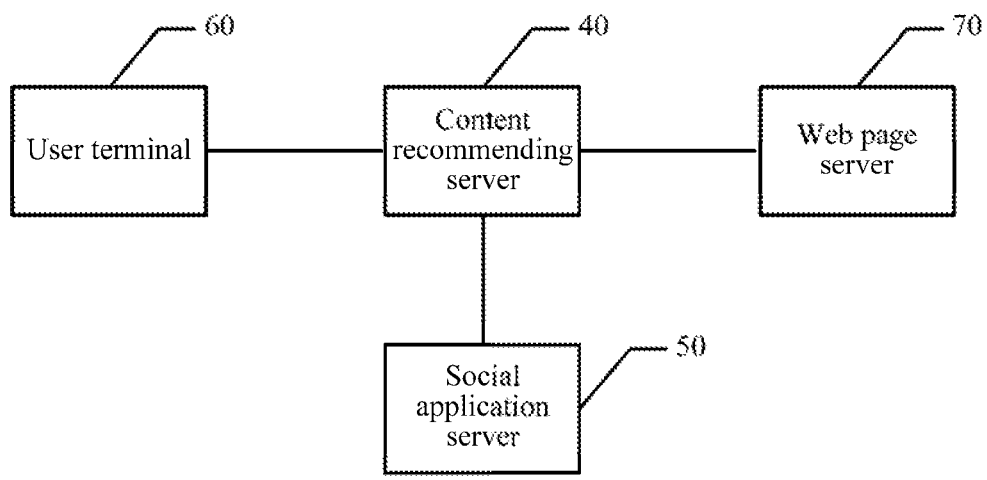
FIG. 14 is a schematic diagram of a recommended content pushing system according to an embodiment of this application.

Referring to FIG. 14, an embodiment of a recommended content pushing system provided by an embodiment of this application includes:

a user terminal 60, a content recommending server 40, a social application server 50, and a web page server 70.

The user terminal 60 is configured to: obtain a user social application account according to a web page obtaining instruction input by a user, and send a web page request to a content recommending server, the web page request carrying an identifier of a web page requested by the user and the user social application account.

The content recommending server 40 is configured to: obtain the web page requested by the user from the web page server 70 according to the identifier of the web page requested by the user, extract content with which the user is concerned from the social application server 50 according to the user social application account, determine recommended content according to the content with which the user is concerned, and push the web page requested by the user and the recommended content to the user terminal.

The user terminal 60 is configured to receive the web page requested by the user and the recommended content that are pushed by the content recommending server.

The recommended content pushing system provided in this embodiment of this application may be understood with reference to the descriptions in FIG. 1 to FIG. 3.

Compared with advertisements recommended on a web page that are pushed either randomly or according to page content of the web page, in the recommended content pushing method provided by this embodiment of this application, recommended content can be determined according to content with which a user is concerned in a social application, thereby improving recommended content pushing accuracy. In addition, in this embodiment of this application, the content with which the user is concerned is determined based on a social application account, and a social application server stores a browsing history of the user, covering rich and detailed content. Therefore, some browsing information input by the user in a browser does not need to be separately recorded. The recommended content pushing system provided by this embodiment of this application further improves recommended content targeting efficiency while improving targeting accuracy.

A person of ordinary skill in the art may understand that all or some of the steps of the methods in the embodiments may be implemented by a program instructing relevant hardware. The program may be stored in a computer readable storage medium. The storage medium may include: a ROM, a RAM, a magnetic disk, or an optical disc.

It is noted that the various modules, submodules, units, subunits, and components in the present disclosure can be implemented using any suitable technology. In an example, a module or a unit can be implemented using integrated circuit (IC). In another example, a module or a unit can be implemented as processing circuitry executing software instructions. In another example, interface circuitry is used to implement receiving unit and/or sending unit.

The recommended content pushing method, apparatus, and system provided by the embodiments of this application are described in detail above, and the text applies specific examples to elaborate the principle and implementations of this application. The foregoing descriptions of the embodiments are only intended to help understand the method and core idea of this application. Meanwhile, to a person of ordinary skill in the art, changes can be made on the specific implementations and application range according to the idea of this application. In conclusion, the content of this specification should not be construed as a limitation on this application.

What is claimed is:

1. A server device, comprising:
   interface circuitry configured to receive a web page request sent from a terminal device, the web page request carrying an identifier of a web page and a social application account of a user, the social application account being an instant message account that is one of a most frequently used account by the user among different instant messaging services; and
   processing circuitry configured to:
      obtain the web page requested by the user according to the identifier of the web page, wherein the identifier of the web page includes at least a specific symbol of the web page and an advertising picture of the web page;
      obtain social information of the user according to the social application account;
      determine recommended content according to the social information; and
      provide the web page and the recommended content to the interface circuitry to transmit to the terminal device.

2. The server device according to claim 1, wherein the processing circuitry is configured to:
   control the interface circuitry to send a request message to a social application server identified by the social application account, the request message carrying the social application account, and the social application account being used for determining the social information of the user by the social application server; and
   receive, via the interface circuitry, the social information of the user determined by the social application server based on the social application account.

3. The server device according to claim 1, wherein the social information of the user comprises a browsing history of the user.

4. The server device according to claim 1, wherein the social information of the user comprises a list of topics of interest that are followed by the user.

5. The server device according to claim 1, wherein the processing circuitry is configured to:
   control the interface circuitry to send a request message to a web page server, the request message carrying the identifier of the web page; and
   receive, via the interface circuitry, the web page provided by the web page server.

6. A method for recommending content, comprising:
   receiving, by a server device, a web page request sent from a terminal device, the web page request carrying an identifier of a web page and a social application account of a user, the social application account being an instant message account that is one of a most frequently used account by the user among different instant messaging services;
   obtaining the web page according to the identifier of the web page, wherein the identifier of the web page includes at least a specific symbol of the web page and an advertising picture of the web page;
   obtaining social information of the user according to the social application account;
   determining recommended content according to the social information; and sending the web page requested by the user and the recommended content to the terminal device.

7. The method according to claim 6, wherein the obtaining the social information of the user according to the social application account comprises:
sending a request message to a social application server identified by the social application account, the request message carrying the social application account, and the social application account being used for determining the social information of the user by the social application server; and
receiving the social information of the user sent by the social application server.

8. The method according to claim 6, wherein the social information of the user comprises a browsing history of the user.

9. The method according to claim 6, wherein the social information of the user comprises a list of topics of interest that are followed by the user.

10. The method according to claim 6, wherein the obtaining the web page according to the identifier of the web page further comprises:
sending a request message to a web page server, the request message carrying the identifier of the web page; and
receiving the web page provided by the web page server.

11. A non-transitory computer-readable medium storing instructions which when executed by a computer causes the computer to perform a method for recommending content, the method comprising:
receiving a web page request sent from a terminal device, the web page request including an identifier of a web page and social application account of a user, the social application account being an instant message account that is one of a most frequently used account by the user among different instant messaging services;
obtaining the web page requested by the user according to the identifier of the web page, wherein the identifier of the web page includes at least a specific symbol of the web page and an advertising picture of the web page;
obtaining social information of the user according to the social application account;
determining recommended content according to the social information; and
sending the web page and the recommended content to the terminal device.

12. The non-transitory computer-readable medium according to claim 11, wherein the obtaining the social information of the user according to the social application account comprises:
sending a request message to a social application server identified by the social application account, the request message carrying the social application account, and the social application account being used for determining the social information of the user by the social application server; and
receiving the social information of the user sent by the social application server.

13. The non-transitory computer-readable medium according to claim 11, wherein the social information of the user comprises a browsing history of the user.

14. The non-transitory computer-readable medium according to claim 11, wherein the social information of the user comprises a list of topics of interest that are followed by the user.

15. The non-transitory computer-readable medium according to claim 11, wherein the obtaining the web page according to the identifier of the web page further comprises:
sending a request message to a web page server, the request message carrying the identifier of the web page; and
receiving the web page provided by the web page server.

* * * * *